United States Patent [19]

Hillesland

[11] 4,318,240
[45] Mar. 9, 1982

[54] CONVERTIBLE DECOYS ASSEMBLED FROM AND COLLAPSIBLE TO FLAT SHEETS

[76] Inventor: Gene G. Hillesland, 703 SW. King Ave., Wadena, Minn. 56482

[21] Appl. No.: 150,425

[22] Filed: May 16, 1980

[51] Int. Cl.³ ............................................. A01M 31/06
[52] U.S. Cl. ........................................................... 43/3
[58] Field of Search ............................. 43/3, 2; 46/157

[56] References Cited

U.S. PATENT DOCUMENTS

| | | | |
|---|---|---|---|
| 1,062,713 | 5/1913 | Johnson | 43/3 |
| 2,395,247 | 2/1946 | Buffenbarger | 43/3 |
| 2,478,585 | 8/1949 | Kouba | 43/3 |
| 2,489,271 | 11/1949 | Colgan | 43/3 |
| 4,172,335 | 10/1979 | Farmer | 43/3 |

Primary Examiner—Jimmy C. Peters
Attorney, Agent, or Firm—Erwin M. Barnett

[57] ABSTRACT

Decoys for use in hunting waterfowl are provided as a plurality of stackable flat sheets, each suitably decorated on each opposite surface thereof to resemble a different species of fowl and having integral tabs and interfitting slits whereby each sheet is readily converted from a flat configuration to a three-dimensional decoy, either surface being selectively exposable to resemble one of the species. A removable stake, extending through openings in a pair of tabs which are in superimposed relation when the decoy is in the three-dimentional state, anchors each decoy in position on the ground.

7 Claims, 10 Drawing Figures

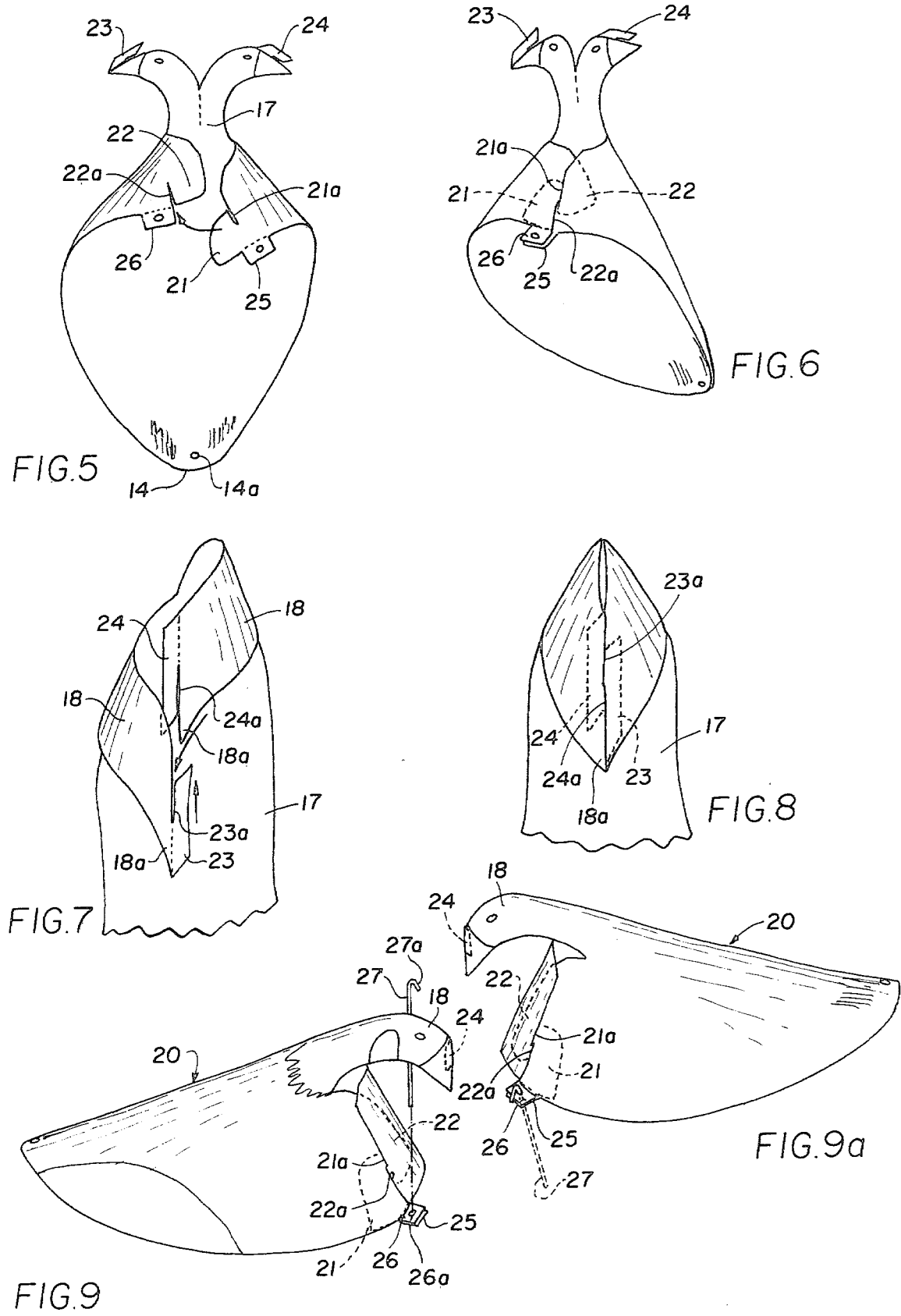

CONVERTIBLE DECOYS ASSEMBLED FROM AND COLLAPSIBLE TO FLAT SHEETS

BACKGROUND OF THE INVENTION

1. Field of the Invention

This invention relates to waterfowl decoys used by hunters to attract the game and more particularly to decoys intended for use on land areas where geese feed and rest, and made of thin sheet material formed to be readily assembled from a flat configuration to a three-dimensional waterfowl simulation.

2. Description of the Prior Art

As many as 50 to 100 decoys are often required to be dispersed in the area of 20 to 30 yards in radius to simulate a game fowl feeding and resting ground to which migrating fowl may be effectively attracted and brought into range of the hunters' guns. Decoys presently in use are made of a relatively heavy, rigid material, such as fiberboard, sheet metal or the like, each either being in the form of a complete silhouette or with the body in an "A" configuration hinged along the upper edge thereof with the neck and head projecting therefrom, the body being collapsible to a folded flattened condition when not in use. Only one surface of this type of decoy is exposable and, therefore, each decoy is limited to a single species of fowl.

Several problems and disadvantages inherent in such hereinbefore mentioned decoys include high unit cost, excessive weight and bulkiness, even when collapsed, this weight and bulkiness materially contributing to the difficulty in transportation to and from the hunting area, in setting out each decoy and in storage when not in use. These prior art decoys also fail to simulate a three-dimensional fowl.

There is, therefore, a need for a low cost, light weight decoy which is easy to set out, recover, transport and store and which will be highly efficient in its three-dimensional simulation of the intended waterfowl.

SUMMARY OF THE INVENTION

Among the objects of the invention is to provide an efficient waterfowl decoy which will be easy to manufacture at low cost in quantity production from a flexible, thin, light weight, waterproof paper by printing and die cutting techniques, which shall be readily converted from a flat configuration, facilitating stacking to save space while storing and transporting in large numbers, to a three-dimentional structure and vice versa, which shall be reversible to simulate two alternative species of fowl and which shall eliminate the problems and disadvantages of prior art devices and meet the needs hereinbefore described.

The invention contemplates such flexible sheet material suitably printed on both sides and die cut into a decoy blank having substantially bilateral symmetry with respect to a longitudinal center line extending from a relatively narrow tail end of the blank through an intermediate, relatively wide body portion having a pair of lateral shoulders. The center line divides the head end of the blank into a pair of head segments which terminate in laterally positioned bills and bifurcate from a neck medially located between the shoulders and projecting from the body portion. Releasable interengaging means are provided as two pairs of tabs and slits integrally formed with the blank. One pair extend from the shoulders and the other pair extend from the head segments enabling the flat blank, when flexed along the center line, to be assembled into the three-dimensional decoy. In so doing, the shoulders are first brought together and releasably retained in breast-forming position by interengagement of the first pair of tabs and slits. The head segments and bills are then brought together to three-dimensionally simulate the head and releasably retained in position by interengagement of the second pair of tabs and slits. Auxiliary tab means having openings for engagement by a ground anchoring stake are also integrally formed with the blank to be located in an operative ground engaging position of the assembled decoy. After use, disengagement of the tabs and slits permits the decoy blank to be returned to a flattened condition for stacking or otherwise storing with other blanks in a face to face compact relation.

BRIEF DESCRIPTION OF THE DRAWINGS

FIGS. 5 and 6 are perspective views showing the initial and final steps, respectively, in the assembly of the breast portion of the decoy with the decorative markings of the Canada goose shown in FIG. 4 exposed.

FIGS. 7 and 8 are fragmentary perspective views showing the initial and final steps, respectively, in the assembly of the head of the decoy thereby completing the conversion to a three-dimensional structure from the spread flat condition of the blank shown in FIG. 4.

FIG. 9 is a right side perspective view of the completed three-dimensional decoy simulating the Canada goose after assembly by the steps shown in FIGS. 5, 6, 7 and 8 ready for securing in place by the pin-like stake, and FIG. 9a is a left side perspective view of a completed three-dimensional decoy similar to FIG. 9 but assembled to expose the snow goose side of the blank shown in FIG. 3.

DESCRIPTION OF THE PREFERRED EMBODIMENT

Figure 1:
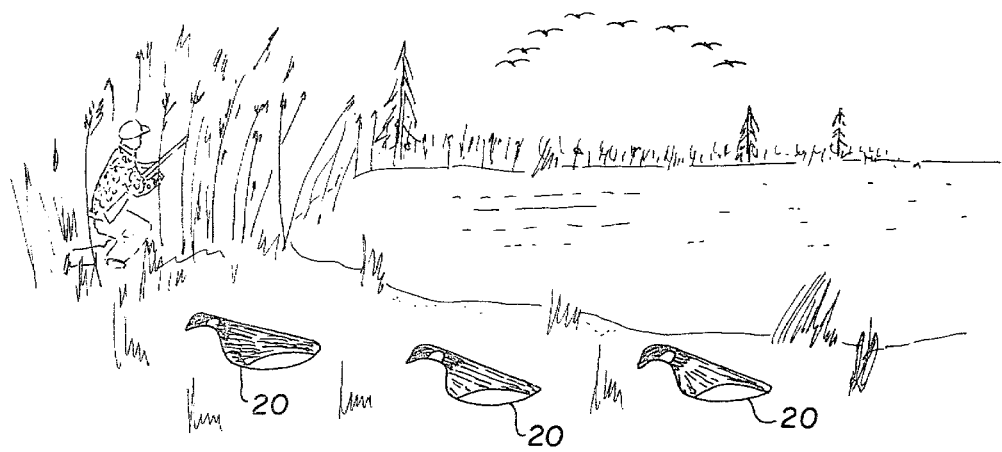
FIG. 1 is a perspective view of a feeding and resting ground on the shore of a lake showing several decoys embodying the invention dispersed in the foreground.
Figures 2, 3, 4:
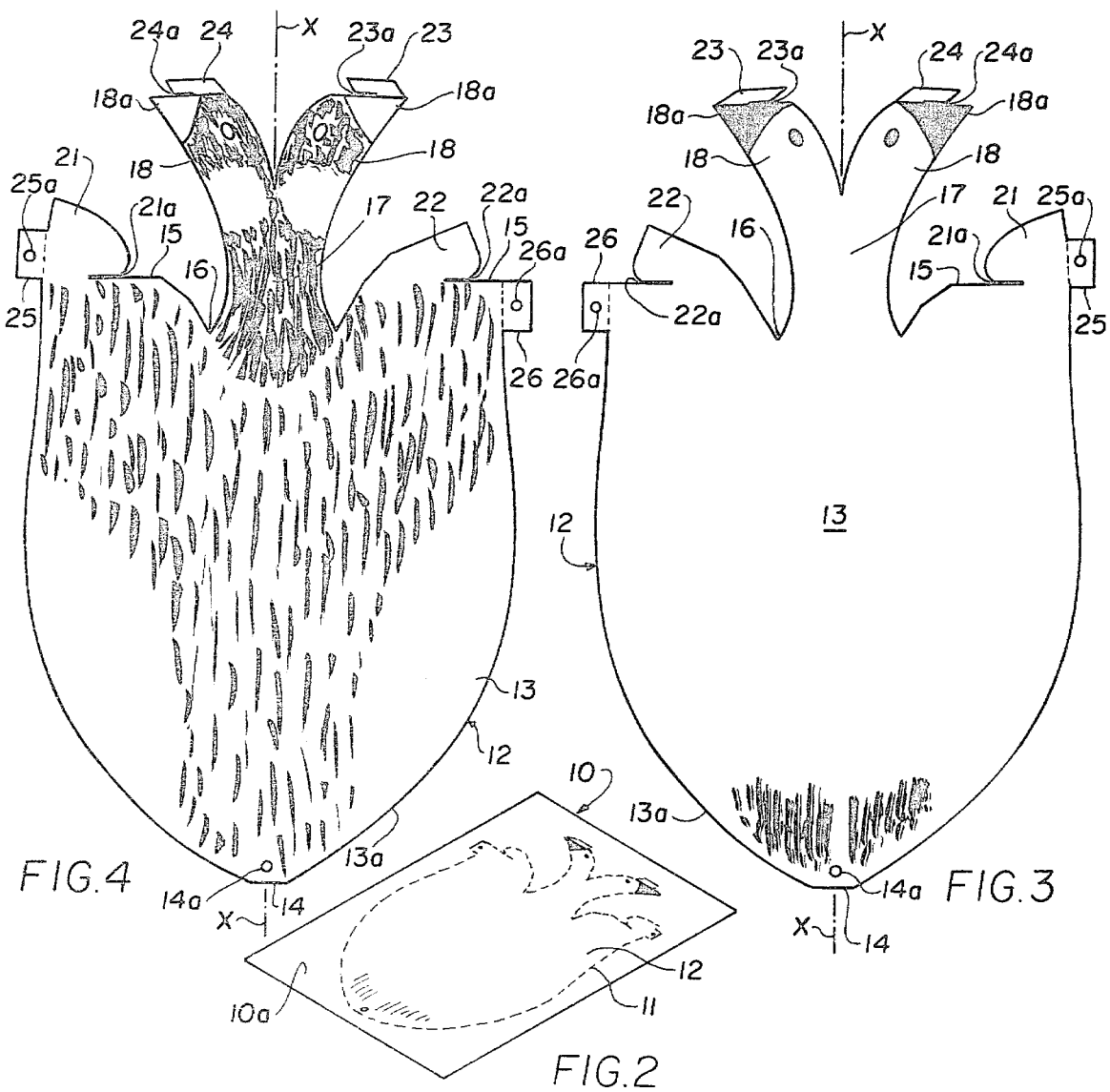
FIG. 2 is a perspective view of a sheet of paper, printed and scored in accordance with the invention to provide a decoy blank as seen in FIGS. 3 and 4.
FIG. 3 is a plan view of the decoy blank shown in FIG. 2 removed from the surrounding sheet material and showing decorative markings simulating the snow goose.
FIG. 4 is a plan view of the reverse side of the decoy blank shown in FIG. 3 showing decorative markings simulating the Canada goose.

Referring in detail to the drawing, 10 denotes a sheet of paper which may be made of a suitable synthetic having a multilayer composite structure, providing waterproof properties, being light-weight and readily flexible yet having a stiffness to retain a desired shape and configuration in the intended use thereof, and having superior printability on both surfaces. Sheet 10 is shown in FIG. 2 as being generally rectangular in shape and perforated by scoring 11 in a predetermined pattern which outlines decoy blank 12 and separably connects the latter to peripheral portion 10a of sheet 10 from which decoy blank 12 is removed prior to use.

Decoy blank 12, when removed from peripheral portion 10a of sheet 10, is an integral structure capable of being flexed from a flat, planar condition to a three-dimensional configuration and releasably secured therein by suitably positioned tabs and slits as shown in the drawing and hereinafter described. Decoy blank 12 is thus seen in FIGS. 3 and 4 in the flat planar condition to be bilaterally symmetrical, with minor exception for providing the releasable interengaging means, with respect to longitudinal center line X—X. This bilateral symmetry is included in a body 13 which tapers in smooth curved edges 13a from a maximum width across a midportion of body portion 13 to a relatively narrow tail 14 located at one end of decoy blank 12. The end of body portion 13 opposite tail 14 is formed as a pair of shoulders 15 extending laterally on opposite sides of a central depression 16 from which neck 17 extends, the latter terminating in bifurcated, head simulating segments 18 having oppositely extending bill portions 18a.

Two pairs of tabs and slits are provided as the interengaging means to releasably secure decoy blank 12 in a flexed, three-dimensional configuration as fully assembled decoy 20 shown in FIG. 9. Thus, one pair of tabs 21 and 22 are integrally formed to extend from shoulders 15 and a second pair of tabs 23 and 24 are integrally formed to extend from the front edges of head segments 18. Tab 21 is attached adjacent the lateral end of one of the shoulders and extends medially so as to provide a slit 21a having an open end facing central depressing 16 and neck 17, whereas tab 22 is attached adjacent the medial end of the other shoulder 15 bordering on central depression 16 and extends laterally so as to provide a slit 22a having an open end facing the lateral end of its shoulder 15, that is, away from neck 17. In the arrangement comparable to that of tabs 21, 22 and slits 21a, 22a of shoulders 15, tabs 23 and 24 are attached adjacent the lateral and medial ends, respectively, of the front edges of head segments 18 thereby providing slits 23a and 24a having open ends facing medially and laterally, respectively.

A third pair of tabs 25 and 26 are integrally formed to extend laterally from the shoulder region of body portion 13 and are located to overlie one another when decoy blank 12 is fashioned into assembled decoy 20, in which superimposed position center openings 25a and 26a formed in tabs 25 and 26, respectively, are in registered alignment to receive a stake 27 therethrough for the purpose hereinafter described. Thus, tab 25 is located to extend from the lateral end of tab 21 while tab 26 extends laterally from the opposite side of body portion 13 adjacent shoulder 15.

The assembly, that is, the conversion of decoy blank 12 into assembled decoy 20 will be clear from FIGS. 5, 6, 7 and 8. With the desired side of blank 12 facing outwardly, shown in the drawing as the side decorated to simulate the Canada goose, blank 12 is flexed, as seen in FIGS. 5 and 6, to bring opposite shoulders 15 toward each other and axially align slits 21a and 22a while disposing the respective tabs 21 and 22 on the interior sides of the opposite shoulders 15. Slits 21a and 22a are then interengaged so that the attached portion of tab 21 engages slit 22a and the attached portion of tab 22 engages slit 21a. When slits 21a and 22a are fully engaged, tab 26 will be superimposed over tab 25 and openings 25a and 26a will be in register.

In a similar manner, head segments 18 are assembled into a three-dimensional head by flexing neck 17, as seen in FIGS. 7 and 8, to bring slits 23a and 24a into axial alignment while disposing the respective tabs 23 and 24 on the interior sides of the opposite head segments 18. Slits 23a and 24a are then interengaged so that the attached portion of tab 23 engages slit 24a and the attached portion of tab 24 engages slit 23a. This completes the assembly of decoy 20 which is now ready for anchoring in position on the ground in the manner hereinafter described.

The practical utility and operation of decoy blanks 12 and the decoys 20 assembled therefrom will now be apparent. Inasmuch as 50 or more three-dimensional decoys 20 are often required to be dispersed in an area selected by the hunter along the route of migration of the game to simulate a waterfowl feeding and resting area to attract fowl of like species, decoy blanks 12 are readily stored in such large numbers for transporting to and from the hunting area in a compact condition in the limited space of recreational vehicles or the like by stacking in spread flat condition or by vertical suspension in face to face relation from suitable hooks or pegs (not shown) engaging an opening 14a which may be formed in each tail 14 for this purpose. After each blank 12 is assembled in the manner hereinbefore described to provide a three-dimensional decoy 20, tabs 25 and 26, which project in a superimposed relation from the lower end of the breast portion formed by the interengagement of slits 21a and 22a, are folded as shown in FIG. 9 to parallel the ground. Stake 27 is then inserted through registering openings 25a and 26a and driven into the ground to anchor decoy 20 in position. Stake 27 may be of any suitable construction having an enlarged head which may be formed as a ring or, as shown herein, as a downwardly bent hook 27a formed at one end of a length of heavy aluminum wire having sufficient rigidity for the intended use of being repeatedly driven into and withdrawn from the ground. Hook 27a, or the ring equivalent, not only engages and retains tabs 25 and 26 when stake 27 is inserted into the ground but also facilitates removal of the latter by providing means for readily grasping stake 27 or means under or into which a tool, such as another stake, may be inserted.

Each decoy 20 may be retrieved after use by removal of stake 27 and disassembled by performing the assembly steps as hereinbefore described in reverse, as will be readily apparent from FIGS. 8, 7, 6 and 5, thereby returning the decoy to its flattened configuration as blank 12 shown in FIGS. 3 and 4. After being disassembled and collected in quantity, blanks 12 may be stacked or suspended on hooks by openings 14a for transportation and storage and are ready for reassembly and reuse as decoys 20 whereby either decorative surface may be selectively exposed to render the dual species convertibility feature embodying the invention.

By way of example, satisfactory results have been achieved for decoy blanks 12 and the decoys 20 assembled therefrom when using a thin, pliable and relatively waterproof synthetic paper for sheet 10, which paper comprises a biaxially oriented, three-ply film having an overall thickness of about 0.010 of an inch and marketed by a leading paper manufacturer under the trademark "KIMDURA".

It will also be apparent that whereas a single tab 25 or 26 is sufficient for coacting with stake 27 to anchor decoy 20 in position on the ground, the coaction of both tabs 25 and 26 with stake 27 engaging openings 25a and 26a serves as positive means for retaining tabs 21, 22 and slits 21a, 22a in operative engagement against accidental separation due to disruptive forces such as wind conditions at the site of use.

The stackable decoy blanks and the three-dimensional decoys assembled therefrom as herein disclosed are seen to achieve the several objects of the invention and to be well adapted to meet conditions of practical use. As various possible embodiments might be made of this invention, and as various changes might be made in the disclosed construction, it is to be understood that all matters herein set forth and shown in the accompanying drawings are to be interpreted as illustrative and not in a limiting sense.

What is claimed is:

1. A water fowl decoy for dispersing a plurality thereof in an area to simulate a feeding and resting ground for such fowl and having an assembly and disassembly capability between a flat planar state for storing and transportation and a three-dimensional operative configuration, said decoy comprising a blank of flexible sheet material printed on at least one surface thereof to simulate the markings of a waterfowl and cut in substantially bilateral symmetry with respect to a longitudinal center line extending from a relatively narrow tail at one end of the blank, through an intermediate relatively wide body portion and terminating at the opposite end in a neck which bifurcates as a pair of head segments extending laterally from said center line, said body portion having a pair of laterally extending shoulders adjacent said neck, and two pairs of integrally formed releasable interengaging means, one pair extending from said shoulders and the other pair extending from said bifurcated head segments enabling said blank, when flexed along said center line as an axis and said printed surface exposed, to be retained in said three-dimensional configuration, said pair of releasable interengaging means extending from said shoulders comprising a pair of tabs, a first of said tabs being attached adjacent the lateral end of a first of said shoulders and extending medially to provide a first slit between the first tab and first shoulder having an open end facing said neck, a second of said tabs being attached adjacent the medial end of the second of said shoulders and extending laterally to provide a second slit between said second tab and second shoulder having an open end facing the lateral end of said second shoulder.

2. The decoy defined in claim 1 in which said pair of releasable interengaging means extending from said bifurcated head segments comprises a second pair of tabs, a first of said second pair of tabs being attached adjacent the lateral end of a first of said head segments and extending medially to provide a third slit between the first of said second pair of tabs and first head section having an open end facing medially, a second of said second pair of tabs being attached adjacent the medial end of the second of said head segments and extending laterally to provide a fourth slit between the second of said second pair of tabs and second head segment having an open end facing laterally.

3. A waterfowl decoy for dispersing a plurality thereof in an area to simulate a feeding and resting ground for such fowl and having an assembly and disassembly capability between a flat planar state for storing and transportation and a three-dimensional operative configuration, said decoy comprising a blank of flexible sheet material printed on at least one surface thereof to simulate the markings of a waterfowl and cut in substantially bilateral symmetry with respect to a longitudinal center line extending from a relatively narrow tail at one end of the blank, through an intermediate relatively wide body portion and terminating at the opposite end in a neck which bifurcates as a pair of head segments extending laterally from said center line, said body portion having a pair of laterally extending shoulders adjacent said neck, and two pairs of integrally formed releasable interengaging means, one pair extending from said shoulders and the other pair extending from said bifurcated head segments enabling said blank, when flexed along said center line as an axis and said printed surface exposed, to be retained in said three-dimensional configuration, said pair of releasable interengaging means extending from said bifurcated head segments comprising a pair of tabs, a first of said tabs being attached adjacent the lateral end of a first of said head segments and extending medially to provide a first slit between the first tab and first head segment having an open end facing medially, a second of said tabs being attached adjacent the medial end of the second of said head segments and extending laterally to provide a second slit between said second tab and second head segment having an open end facing laterally.

4. A waterfowl decoy for dispersing a plurality thereof in an area to simulate a feeding and resting ground for such fowl and having an assembly and disassembly capability between a flat planar state for storing and transportation and a three-dimensional operative configuration, said decoy comprising a blank of flexible sheet material printed on at least one surface thereof to simulate the markings of a waterfowl and cut in substantially bilateral symmetry with respect to a longitudinal center line extending from a relatively narrow tail at one end of the blank, through an intermediate relatively wide body portion and terminating at the opposite end in a neck which bifurcates as a pair of head segments extending laterally from said center line, said body portion having a pair of laterally extending shoulders adjacent said neck, two pairs of integrally formed releasable interengaging means, one pair extending from said shoulders and the other pair extending from said bifurcated head segments enabling said blank, when flexed along said center line as an axis and said printed surface exposed, to be retained in said three-dimensional configuration, and a pair of tabs integrally formed with said blank, each tab having an opening extending therethrough, one of said tabs extending laterally adjacent each of said shoulders and being offset from each other when said blank is in said planar state enabling said tabs to be brought into a superimposed relation with said openings in register when said blank is brought into said three-dimensional configuration and retained therein by said interengaging means, said tabs being adapted to fold into a ground parallelling position, and a stake extending through said openings into the ground and having a head engaging said superimposed tabs simultaneously anchoring said decoy in position and securing said first pair of releasable interengaging means against accidental disengagement.

5. The decoy defined in claim 4 in which said stake is a length of rigid wire and said head is a bent hook formed on one end thereof.

6. The decoy defined in claim 4 in which an opening is formed in said blank adjacent the tail end thereof for removably suspending the blank in said flat planar state from a supporting means extending through the opening in vertical face to face relation with other like blanks.

7. A waterfowl decoy for dispersing a plurality thereof in an area to simulate a feeding and resting ground for such fowl and having an assembly and disassembly capability between a flat planar state for storing and transportation and a three-dimensional operative configuration, said decoy comprising a blank of flexible sheet material cut in substantially bilateral symmetry with respect to a longitudinal center line extending from a relatively narrow tail at one end of the blank, through an intermediate relatively wide body portion and terminating at the opposite end in a neck which bifurcates as a pair of head segments extending laterally from said center line, said blank having each opposite surface thereof printed to simulate markings of a species of waterfowl different from the other providing convertibility from one species to the other, said body portion having a pair of laterally extending shoulders adjacent said neck, two pairs of integrally formed releasable interengaging means, one pair extending from said shoulders and the other pair extending from said bifurcated head segments, said blank being capable of being flexed along said center line as an axis in either direction to selectively expose either one or the other of said printed surfaces in effecting said blank convertibility, said blank being retained in said selected three-dimensional configuration by said two pairs of releasable interengaging means, and an integrally formed tab located to extend from the lower side of the blank when the latter is retained in said three-dimensional configuration and being adapted to fold into a ground parallelling position, said tab having an opening for receiving a ground anchoring stake therethrough when in said ground parallelling position.

* * * * *